United States Patent [19]
Kanninen et al.

[11] Patent Number: 5,931,017
[45] Date of Patent: Aug. 3, 1999

[54] ARRANGEMENT FOR COOLING SUPPLY AIR IN AN AIR-CONDITIONING INSTALLATION

[75] Inventors: Seppo Kalevi Kanninen; Ingmar Erik Rolin, both of Espoo; Seppo Juhani Leskinen, Västerskog, all of Finland

[73] Assignee: ABB Installaatiot OY, Finland

[21] Appl. No.: 08/596,247

[22] PCT Filed: Aug. 9, 1994

[86] PCT No.: PCT/FI94/00342

§ 371 Date: Apr. 19, 1996

§ 102(e) Date: Apr. 19, 1996

[87] PCT Pub. No.: WO95/04902

PCT Pub. Date: Feb. 16, 1995

[30] Foreign Application Priority Data

Aug. 10, 1993 [FI] Finland ..................................... 933534

[51] Int. Cl.⁶ ............................. F25B 29/00; F25D 17/04; F24F 3/00; F24F 3/147
[52] U.S. Cl. .................... 62/309; 62/171; 62/DIG. 22; 62/314; 165/54; 165/60; 165/66; 261/153; 261/157
[58] Field of Search .............................. 62/305, 309, 171, 62/DIG. 22, 314; 165/54, 60, 66, 909; 261/153, 157

[56] References Cited

U.S. PATENT DOCUMENTS

| | | | |
|---|---|---|---|
| 3,808,832 | 5/1974 | Zusmanovich | 62/309 |
| 4,938,035 | 7/1990 | Dinh | 62/305 |
| 5,078,208 | 1/1992 | Urch | 62/305 |
| 5,187,946 | 2/1993 | Rotenberg et al. | 62/309 |

FOREIGN PATENT DOCUMENTS

| | | |
|---|---|---|
| 0 508 766 A2 | 10/1992 | European Pat. Off. . |
| 57478 | 8/1980 | Finland . |
| 67259 | 10/1984 | Finland . |
| 88431 | 1/1993 | Finland . |
| 88650 | 2/1993 | Finland . |
| 92867 | 9/1994 | Finland . |
| WO 84/02756 | 9/1984 | WIPO . |
| WO 91/02927 | 3/1991 | WIPO . |
| WO 92/20973 | 11/1992 | WIPO . |
| WO 93/10403 | 5/1993 | WIPO . |

OTHER PUBLICATIONS

Evaporative Air–Cooling Equipment, Chapter 4, Ashrae Equipment (no date).
"Evaporative Air–Cooling Equipment", *1983 Equipmnt Handbook*, Chapter 4, pp. 4.1–4.10.

*Primary Examiner*—John K. Ford
*Attorney, Agent, or Firm*—Fitch, Even, Tabin & Flannery

[57] ABSTRACT

The invention relates to an arrangement for cooling supply air in an air-conditioning installation, comprising a heat transfer device for transferring heat between supply air and exhaust air by means of heat transfer surfaces; and a humidifying device for humidifying heat transfer surfaces on the exhaust air side. In order that supply air could be cooled more efficiently, the heat transfer surfaces on the side of supply air and exhaust air are separated into separate heat exchangers; and the heat transfer surfaces are selected in such a way that the surface temperature of the heat transfer surfaces on the exhaust air side is close to the dew-point temperature of exhaust air.

7 Claims, 3 Drawing Sheets

ARRANGEMENT FOR COOLING SUPPLY AIR IN AN AIR-CONDITIONING INSTALLATION

BACKGROUND OF THE INVENTION

This invention relates to an arrangement for cooling supply air in an air-conditioning installation, comprising a heat transfer device for transferring heat between supply air and exhaust air by means of heat transfer surfaces; and a humidifying device for humidifying the heat transfer surfaces on the exhaust air side.

Efforts made to reduce the use of freons have compelled the air-conditioning industry to look for alternative cooling systems in place of compressor cooling utilizing freons. The best-known of such systems is the so-called indirect evaporative cooling described e.g. in Finnish Patent Specification 67 259. In this method, exhaust air is humidified by an evaporative humidifier positioned in an exhaust duct, whereby water binds heat as it evaporates so that the temperature of exhaust air drops close to the saturation point. "Coldness" in the cooled exhaust air is recovered into supply air by a heat exchanger presently used widely in the recovery of heat in winter; in other words, supply air is cooled.

A drawback of the system is its limited cooling power. Especially when exhaust air and/or outdoor air is warm and moist, the cooling power is not sufficient. This is due to the fact that moist air is not able to receive any greater amounts of water steam, and so its saturation temperature is high. In addition, evaporative humidifiers are not usually able to humidify air up to the dew point. The humidification ratio has been defined as the mass ratio between the amount of water that in theory can be evaporated into air and the amount of water that actually is evaporated. The humidification ratio of the best evaporative humidifiers ranges between 80 and 90%. In addition to this, the cooling power is reduced by the efficiency of the heat exchanger, which is usually defined as the ratio of the temperature drop of supply air to the difference between the initial temperatures of supply air and exhaust air. This ratio, called temperature efficiency, is between 70 and 80% for the best air/air heat exchangers. As a whole, the ratio between the actually achievable cooling power and the theoretical cooling power usually remains below 70%. Not even the theoretical power would be sufficient in all cases.

Various attempts have been made to compensate for the limited cooling power. The simplest way is to provide the missing power by the use of compressor cooling, which, however, involves considerable investment and operating costs. Even though the use of freons is reduced, it cannot be totally avoided.

Another approach is described in Finnish Patent Specification 88431. Additional cooling is accomplished by the use of cold tap water before the water is passed into the network of water pipes in the building. A drawback of this method is that in many cases the tap water consumption of buildings is so low and varies to such an extent that it is able to meet the need of additional cooling only in a limited number of buildings. Overflowing cooling water into the drain easily raises the operating costs unreasonably. Moreover, an additional piping has to be provided in the building for cold drinking water, which increases the investment costs. For this reason, tap water can be used to cut down load peaks only in some buildings.

Still another approach is described in Finnish Patent Specification 57 478. Instead of using a separate humidifier, air is humidified by allowing humidifying water to run onto the heat transfer surfaces on the delivery side of a plate heat exchanger. In this patent specification, in an attempt to increase power, 2-step cooling is used, where so-called auxiliary air, which may consist of exhaust air or supply air, is first cooled in an auxiliary heat exchanger and then humidified and used for cooling supply air.

Due to its high investment and operating costs, the 2-step cooling has not been used widely. In order that real benefit could be derived, an extra heat exchanger is needed as well as a blower or the like for drawing the auxiliary air flow through the heat exchanger. Air cooling as such will not give the desired result, as the mass ratios vary. It may be used successfully when the amount of exhaust air is about 2 times greater than the amount of supply air for some special reason. In addition, the cooling power of the second step is substantially lower than that of the first step.

Instead, humidified heat exchangers have been built to some extent. In theory, they should operate in such a way that the temperature of a moisture film on the outer surface of the heat exchanger will coincide with the saturation temperature of air. The air treatment process should, in theory, take place as illustrated by an exemplifying curve in the h-x diagram of FIG. 1, i.e. in the following way:

The temperature of supply air=outdoor air is assumed to be 27° C., and the relative humidity 40%, point A in FIG. 1. The temperature of exhaust air=room air is assumed to be 24° C., and the relative humidity 50%, point B in FIG. 1. In theory, the surface of the heat exchanger on the exhaust air side should be at its dew point, that is, at a temperature corresponding to a relative humidity of 100%, i.e. 17° C., point C in FIG. 1. After a separate evaporative humidifier, the temperature of exhaust air would be slightly above the humidification ratio, with a humidification ratio of 0.88, for instance, about 18° C., point C' in FIG. 1. The difference is thus 1° C.

As one surface of the heat exchanger is, in theory, at the dew-point temperature, there are no surface resistances in the heat transfer on this side. In other words, there should occur a decisive improvement in the heat transfer coefficient and thus in the temperature efficiency. The relatively complicated theory of heat transfer will not be explained herein, but it may suffice to mention that an efficiency of 0.7 corresponding e.g. to dry heat transfer should be improved to about 0.84. The corresponding temperature drop of supply air is $$\Delta t_s = \eta_A(t_A - t_B),$$

where η=temperature efficiency 0.84

$t_A$=entry temperature of supply air=27° C.

$t_B$=surface temperature on exhaust side=17° C.

($t_A$ and $t_B$=temperatures at points A and B)

that is $$\Delta t_s = 0.84(27-17) = 8.4° \text{ C.}$$

The final temperature of supply air would thus be $t_D$=27−8.4=18.6° C. (point D, FIG. 1). The power available for cooling is represented by the difference between the entry temperature of exhaust air and the final temperature of supply air, i.e.

$$\Delta t_j = 24 - 18.6 = 5.4° \text{ C.}$$

In a system employing a separate humidifier the following applies:

$$\Delta t'_s = 0.7(27-18) = 6.3° \text{ C.}$$

and the final temperature of supply air $t_D=27-6.3=20.7°$ C. (point D' in FIG. 1).

The power available for cooling:

$$\Delta t'_j=24-20.7=3.3°C.$$

The power available for cooling (for removing thermal loads) would thus increase really significantly, that is, in the ratio $$\Delta t_j/\Delta t'_j=5.4/3.3=1.63.$$

The power increase thus seems to be considerable.

In practice, however, this does not hold true. It has been found that the final temperature of supply air remains clearly above the value to which it should drop according to the above theory. In practice, the power increase is only 10 to 25% as compared with a separate humidifier. In fact, the change of state of exhaust air takes place in the direction of a curve drawn by broken line in FIG. 1, towards a temperature above the dew point. This is due to the fact that heat transfer and evaporation are dynamic processes, which typically take place at a specific speed.

On examining the moisture film on the surface of the heat exchanger, it can be seen that heat is introduced into the film from supply air and removed from it into exhaust air partly through conduction, partly bound in the evaporating water steam. In order that the temperature of the moisture film would coincide with the dew point, heat should be bound merely in the evaporation of water steam. In practice, this does not happen as the surface that evaporates water is too small. As compared with e.g. the humidification cells of the above-mentioned evaporative humidifiers, the area of the moisture film formed on the plate heat exchanger is only a fraction. The evaporation rate from the too small liquid surface is simply too low to maintain the moisture film at a temperature corresponding to the dew point. The heat transfer takes place partly through conduction, and therefore the change of state takes place along a curve drawn by broken line in FIG. 1.

The plate heat exchanger disclosed in Finnish Patent Specification 57 478 also has another drawback. Bacterial contamination easily occurs on moist surfaces within the above-mentioned temperature range. As plate heat exchangers are large in size, it is difficult to make them water-proof; in practice, minor leakages occur as a result of corrosion, thermal expansion, vibration, pressure variation, etc. Water seeping to the supply air side evaporates, whereby possible bacteria become encapsulated and are entrained in the supply air. The resulting health hazard is so severe that humidified plate heat exchangers have been totally abandoned.

SUMMARY OF THE INVENTION

The object of the present invention is to provide an arrangement which enables the theoretical performance values of a wet heat exchanger to be achieved while avoiding any health hazards.

This object is achieved by an arrangement according to the invention, which is characterized in that the heat transfer surfaces on the side of supply air and exhaust air, respectively, are separated into separate heat exchangers; and that the heat transfer surfaces are selected in such a way that the surface temperature of the heat transfer surfaces on the exhaust air side is close to the dew-point temperature of exhaust air.

The arrangement according to the invention also allows the supply of additional cooling power from tap water, ground water, or any energy source having a temperature only slightly different from the desired temperature of supply air. Even the cooling power of humidifying water can be utilized, and tap water can be utilized more economically than previously.

The invention is based on the fact that as the evaporation surface in the heat exchanger is too small, it should be enlarged. Even though the increase in investment costs would be ignored, it is easy to notice that as the heat surface on both the supply air and the exhaust air side becomes larger, the nature of the heat transfer process will not change, that is, the ratios between the heat flows remain unchanged, and the moisture film is still at a temperature above the dew point. The temperature efficiency, of course, improves.

The basic idea of the invention is, in fact, that the ratios between the heat transfer surfaces are changed, that is, the evaporation surface is enlarged, so that one gets closer to the dew-point temperature. When a plate heat exchanger is used, this is difficult and expensive. Another basic concept of the invention is thus that the heat surfaces are separated from each other in a manner known per se by transferring heat on the supply side by a separate heat exchanger into an intermediate liquid and then by another heat exchanger from the intermediate liquid into exhaust air. The ratio between the heat flows can now be selected freely so that one gets close to the dew point on the exhaust side.

As the heat transfer takes place by separate heat exchangers, the hygiene risks are eliminated. Furthermore, separate heat exchangers have a third major advantage: separated systems can be built. Exhaust and supply air apparatuses need not be positioned at the same place. In addition, there may be two or more exhaust air apparatuses per a single supply air apparatus, or vice versa, two or more supply air apparatuses may operate together with a single exhaust air apparatus.

An advantage perhaps even more important is that, especially in the system disclosed in Finnish Patent Application 915 511, additional energy can be supplied into the system directly into the heat transfer circuit or at least by the use of small liquid/liquid heat exchangers having costs only a fraction of those of liquid/air heat exchangers. Even the "excessive" cooling power of humidifying water can be utilized. Additional energy from e.g. tap water can be utilized "twice" as described below: first in additionally cooling supply air and then in reducing the temperature of the moisture film on the exhaust side.

The invention also allows the air-conditioning apparatuses to be designed more economically, as the front surface speed in the heat exchanger or the humidifying section is not a factor determining the dimensions of the apparatus if the exchangers are positioned as described below. With the exception of the heat exchangers, the apparatus size can be reduced even by 35% with corresponding savings in costs.

The other advantages of the humidified heat exchanger remain unchanged. For instance, no separate humidifying section is needed, which reduces costs, diminishes pressure losses, and decreases the need of maintenance.

Moreover, certain embodiments do not require any exhaust air filters.

BRIEF DESCRIPTION OF THE DRAWINGS

The following the invention will be described more closely with reference to the attached drawings, where.

DESCRIPTION

Figure 2:
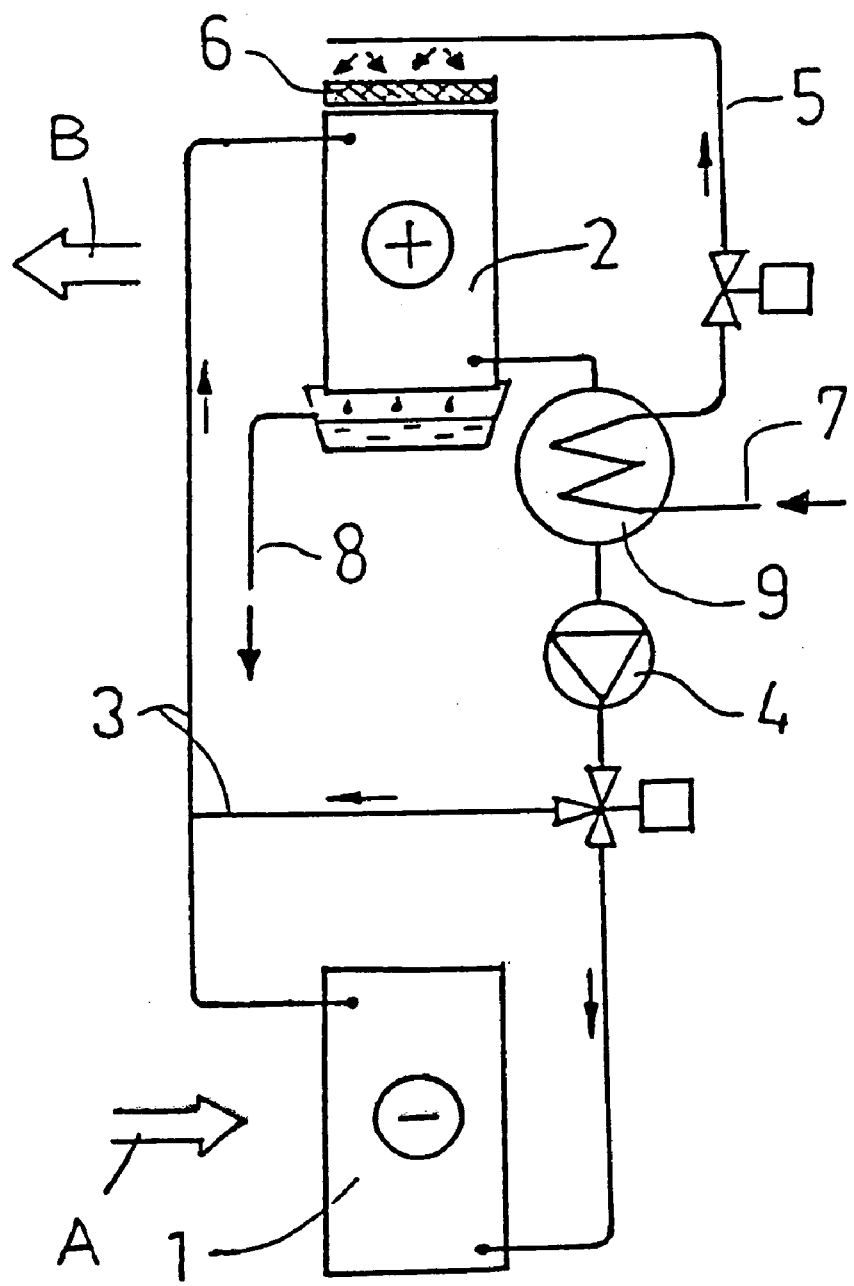
FIG. 2 illustrates schematically a first embodiment of the arrangement according to the invention.

The arrangement shown in FIG. 2 comprises a heat exchanger 1 for supply air A; a heat exchanger 2 for exhaust air B; an interconnecting piping 3, through which a pump 4 circulates heat transfer liquid; and a humidifying piping 5, from which humidifying water is allowed to run through a humidifying mat 6 onto heat transfer surfaces of the heat exchanger 2 on the exhaust side. In the arrangement shown in FIG. 2, water is not circulated, but a constant amount of water is taken from a tap water piping 7, and "excessive" humidifying water that does not evaporate into exhaust air is discharged through an overflow pipe 8 into a drain. In more advanced arrangements, only a limited, usually constant amount of humidifying water is admitted into the drain, which prevents the concentration of impurities, bacteria, etc. The rest is returned to the humidifying step by a special circulation pump. In this way, less humidifying water is needed.

As appears from FIG. 2, no humidifying water is fed directly into the humidifying piping 5, but it circulates through a liquid/liquid heat exchanger 9 provided in the piping 3 leading to the heat exchanger 1 for supply air. The temperature of tap water is usually below 10° C. In the heat exchanger 9, the cooling power that is below the dew point, almost all of which would otherwise be wasted, is transferred directly into the heat transfer liquid that cools supply air. By the use of a conventional overflow and conventional exchanger efficiencies, an extra cooling power corresponding to a temperature difference of about 0.5° C. can be transferred into supply air. The costs of the small liquid/liquid heat exchanger 9 are negligible.

By increasing the quantity of overflow water, an inexpensive and simple tap water cooling system is achieved. Investments are low, whereas the operating costs rise rapidly when the overflow is increased. On the other hand, the surface temperature on the exhaust side is lower.

Figure 3:
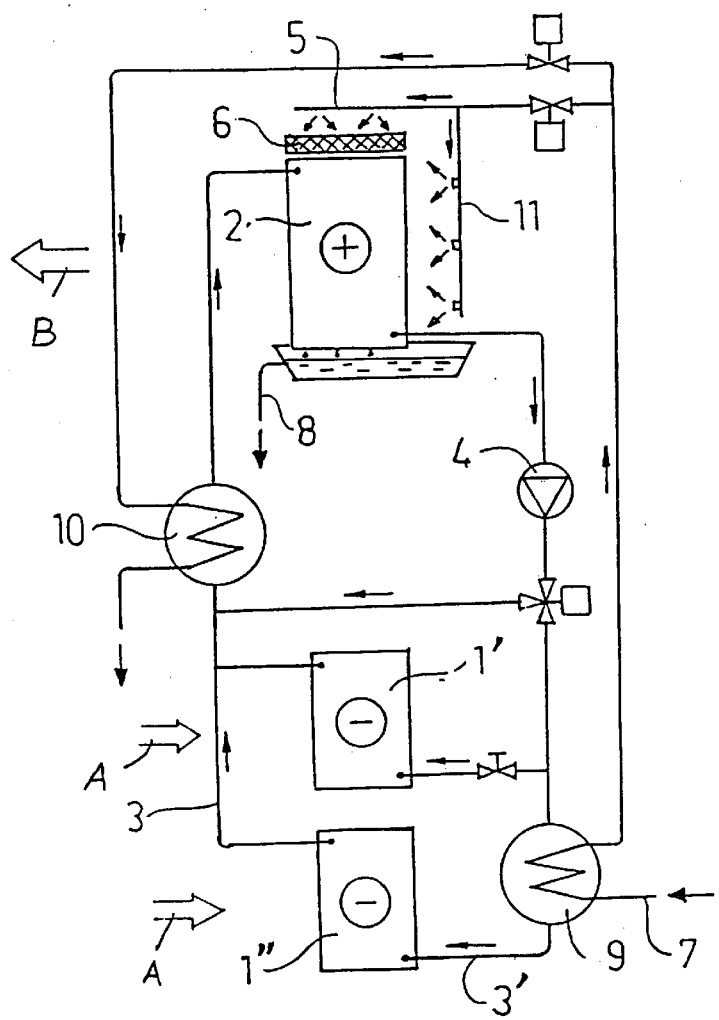
FIGS. 3 to 5 illustrate alternative embodiments of the arrangement.

FIG. 3 shows a more advanced arrangement. The heat exchanger for supply air is divided into two sections 1' and 1", of which section 1' serves a building portion exposed to a heavy thermal load, such as its south side, while section 1" serves the less heavily loaded portion of the building. A heat exchanger 9 intended for humidifying water and tap water is positioned in a supply pipe 3' of the heat exchanger 1' serving the more heavily loaded building portion. In this way, the entire cooling power can be directed to the building portion where it is needed.

Figure 1:
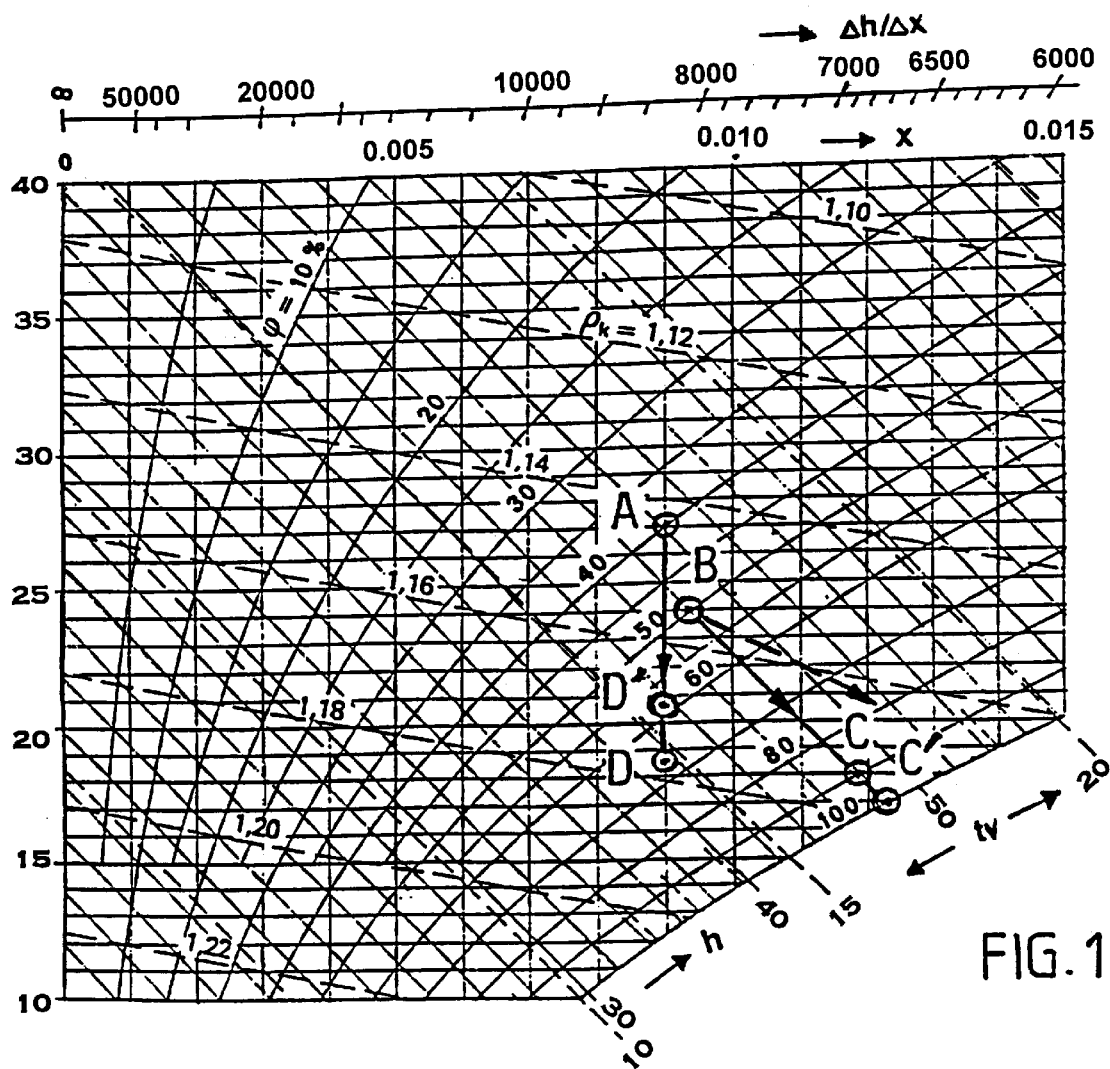
FIG. 1 is an h-x diagram for air temperature.

In the solution shown in FIG. 3, all water is not guided into the humidifying piping 5, but only an amount required for humidification and minimum overflow. The rest is passed to an additional heat exchanger 10, where it is used to cool the heat transfer liquid returning from the heat exchanger 1 for supply air to the heat exchanger 2 for exhaust air. For instance, if the cooling demand of the heat transfer liquid entering the heat exchanger 1' is 4° C., an almost equal reduction is achieved "for nothing" in the temperature of the heat transfer liquid flowing from the heat exchanger 1' to the heat exchanger 2 for exhaust air. This decreases the temperature differences in the heat exchanger 2 for exhaust air, whereby the curve drawn by broken line in FIG. 1 shifts closer to the theoretical curve B-C', i.e. the heat transfer in the exchanger 2 improves. From the heat exchanger 10 water can be passed into the drain or for use in the building. If it is used e.g. as warm tap water, the solution of FIG. 3 also decreases the demand of thermal energy significantly. Tap water can be pre-heated approximately from 8° C. to 25° C., i.e. the saving is about 35% of the water heating costs, although only during the peak load. During the entire cooling period, a temperature of about 20° C. is achieved, which corresponds to a saving of about 25%, that is, a saving of about 6% in yearly costs as calculated on the yearly consumption.

FIG. 3 also shows another way of decreasing the surface temperature of the heat exchanger for exhaust air. By means of a nozzle piping 11 water is sprayed into the air as very small droplets, which increase the heat transfer surface considerably, and reduce the air temperature and the surface temperature at the terminal end of a counter-flow battery, which, in fact, is desirable. The nozzle piping 11 may be positioned relatively close to the heat exchanger 2, because the finely divided water spray hovers relatively deep into the heat exchanger 2 between its heat transfer surfaces before the water droplets evaporate or come into contact with the heat transfer surfaces. The change of state of air shifts very close to the theoretical change of state B-C' in FIG. 1, and the temperature of the water returning through the pump 4 shifts close to the theoretical value, i.e. the dew-point temperature of air.

The basic concept, i.e. the separation of the heat transfer surfaces from each other, also allows the air-conditioning apparatuses to be designed more economically than previously. This is especially important when the supply and exhaust air flows are unequal in size. Each apparatus can be designed for its specific air flow, which is not possible e.g. in the solution disclosed in Finnish Patent Specification 57 478, where both apparatuses are designed according to the larger air flow.

Figure 4:
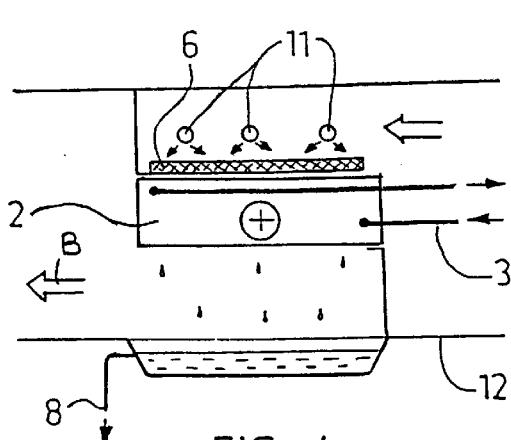
Figure 5:
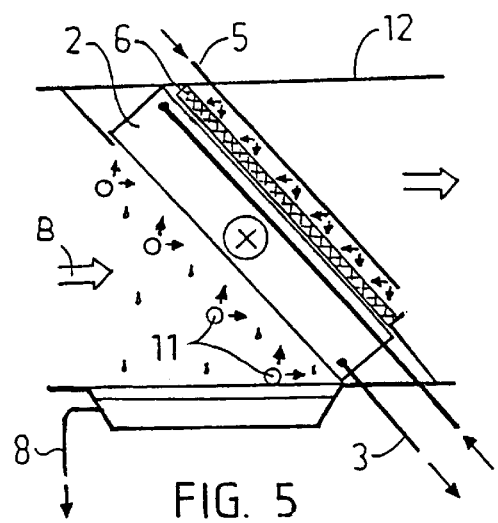

FIGS. 4 and 5 show preferred ways of positioning the heat exchanger 2 in a housing 12 of the air-conditioning apparatus. In both figures, the basic idea is to mount the heat exchanger 2 in such a position that its front surface can be enlarged. This is because the front surface speed of the heat exchanger limits the selection of apparatus size due to both the great pressure loss of the exchanger and the fact that when the front surface speed of air exceeds 2.5 m/s, drops are entrained in the air flow. The heat exchanger can now be designed for a front surface speed less than 2.5 m/s, and the other components for the speed of 4 m/s determined mainly by the filters, whereby their costs are reduced in proportion to the speeds, that is, even 35%. Of course, FIGS. 4 and 5 are mere examples. The directions of flow of air and liquids, the positioning of the components, etc., may naturally vary as well as the angles of the heat exchangers, the flows can be evened out and pressure losses reduced by baffle plates, etc.

In FIGS. 4 and 5, the humidifying mat 6 is positioned on the front surface of the heat exchanger 2 in the duct 12 for exhaust air in such a way that the air flows through the mat 6. In this way, the heat transfer surfaces will be humidified more reliably and evenly, and the temperature distribution will be more advantageous. In addition, additional evaporation surface will be obtained "for nothing", so that the effect is similar to that of the spraying means 11. If the material of the humidifying mat 6 is selected suitably, it also filters solid particles from the air sufficiently efficiently. It is thereby possible in the summertime to remove the exhaust air filters protecting the heat surfaces of the heat exchanger 2 from impurities, and mount the humidifying mat 6 in place. In this way the filter costs can be reduced, and the pressure loss of the exhaust system can be diminished, i.e. the consumption of electricity is decreased with resulting savings in costs.

The drawings and the description related to them are only intended to illustrate the idea of the invention. In its details, the arrangement according to the invention may vary within the scope of the claims.

We claim:

1. An arrangement for cooling supply air in an air-conditioning installation, comprising:

a heat transfer device for transferring heat between supply air and exhaust air comprising separate supply air and exhaust air heat exchangers each comprising heat transfer surfaces;

a humidifying device comprising a source of humidifying water for humidifying the heat transfer surfaces on the exhaust air side;

the ratio between the heat transfer surfaces for supply air and exhaust air respectively being selected in such a way that the surface temperature of the heat transfer surfaces on the exhaust air side is close to the dew-point temperature of exhaust air;

the heat exchangers on the side of supply air and exhaust air being connected by common piping for heat transfer liquid and the piping comprising a cooling means connected to an external source of cooling energy for cooling heat transfer liquid returning from the heat exchanger on the exhaust air side to the heat exchanger on the supply air side by the external cooling energy; and the cooling means being connected to the humidifying device, and tap water being used as humidifying water in the humidifying device.

2. An arrangement according to claim 1 wherein the portion of tap water which is not needed for humidification and after the cooling of the heat transfer liquid returning from the heat exchanger on the exhaust air side is returned to a water network of a building.

3. An arrangement according to claim 2 wherein the piping for heat transfer liquid is provided with an additional cooling means for cooling heat transfer liquid entering the heat exchanger on the exhaust air side by means of said excessive tap water portion.

4. An arrangement for cooling supply air in an air-conditioning installation, comprising:

a heat transfer device for transferring heat between supply air and exhaust air comprising separate supply air and exhaust air heat exchangers each comprising heat transfer surfaces;

a humidifying device comprising a source of humidifying water for humidifying the heat transfer surfaces on the exhaust air side;

the ratio between the heat transfer surfaces for supply air and exhaust air respectively being selected in such a way that the surface temperature of the heat transfer surfaces on the exhaust air side is close to the dew-point temperature of exhaust air; and the heat exchangers on the side of supply air and exhaust air being connected by common piping for heat transfer liquid and the piping comprising a cooling means connected to the humidifying device for cooling heat transfer liquid returning from the heat exchanger on the exhaust air side to the heat exchanger on the supply air side by humidifying water.

5. An arrangement according to claim 4 wherein the cooling energy is provided by the humidifying water.

6. An arrangement according to claim 4 wherein the portion of tap water which is not needed for humidification and after cooling of the heat transfer liquid returning from the heat exchanger on the exhaust air side is returned to a water network of a building.

7. An arrangement for cooling supply air in an air-conditioning installation, comprising:

a heat transfer device for transferring heat between supply air and exhaust air comprising separate supply air and exhaust air heat exchangers each comprising heat transfer surfaces;

a humidifying device comprising a source of humidifying water for humidifying the heat transfer surfaces on the exhaust air side;

the ratio between the heat transfer surfaces for supply air and exhaust air respectively being selected in such a way that the surface temperature of the heat transfer surfaces on the exhaust air side is close to the dew-point temperature of exhaust air;

the heat exchangers on the side of supply air and exhaust air being connected by common piping for heat transfer liquid and the piping comprising a cooling means connected to an external source of cooling energy for cooling heat transfer liquid returning from the heat exchanger on the exhaust air side to the heat exchanger on the supply air side by the external cooling energy;

the cooling-means comprising a liquid/liquid heat exchanger; and the cooling means being connected to the humidifying device, and tap water being used as humidifying water in the humidifying device.

* * * * *